(12) United States Patent
Oumi et al.

(10) Patent No.: US 6,473,384 B1
(45) Date of Patent: Oct. 29, 2002

(54) NEAR FIELD OPTICAL HEAD HAVING FLEXIBLE STRUCTURE

(75) Inventors: Manabu Oumi, Chiba (JP); Yasuyuki Mitsuoka, Chiba (JP); Nobuyuki Kasama, Chiba (JP); Kenji Kato, Chiba (JP); Takashi Niwa, Chiba (JP); Hidetaka Maeda, Chiba (JP); Yoko Shinohara, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/787,855
(22) PCT Filed: Jul. 18, 2000
(86) PCT No.: PCT/JP00/04824
§ 371 (c)(1),
(2), (4) Date: Apr. 27, 2001
(87) PCT Pub. No.: WO01/08142
PCT Pub. Date: Feb. 1, 2001

(30) Foreign Application Priority Data

Jul. 26, 1999 (JP) .............................................. 11-210971
Jun. 19, 2000 (JP) ....................................... 2000-183285

(51) Int. Cl.$^7$ ................................................. G11B 7/00
(52) U.S. Cl. ............................. 369/112.01; 369/112.27; 369/244

(58) Field of Search ........................... 369/13.32, 13.33, 369/112.01, 126, 44.15, 112.27, 121, 220, 244, 250, 251, 254

(56) References Cited

U.S. PATENT DOCUMENTS 6,034,938 A * 3/2000 Heanue et al. ........... 369/13.32

* cited by examiner

Primary Examiner—Paul W. Huber
(74) Attorney, Agent, or Firm—Adams & Wilks

(57) ABSTRACT

An optical information device has a suspension arm, a moving mechanism for movably supporting the suspension arm relative to a recording medium, an optical head supported by the suspension arm proximate the recording medium and having a slider and a flexible structure for linking the slider to the suspension arm so that the slider undergoes relative sliding movement with respect to the recording medium for at least one of recording information to the recording medium and reading information from the recording medium, and an optical waveguide for guiding light between the suspension arm and the slider. The optical waveguide is integrally formed with the flexible structure and preferably comprises patterned films formed on the optical head.

23 Claims, 9 Drawing Sheets

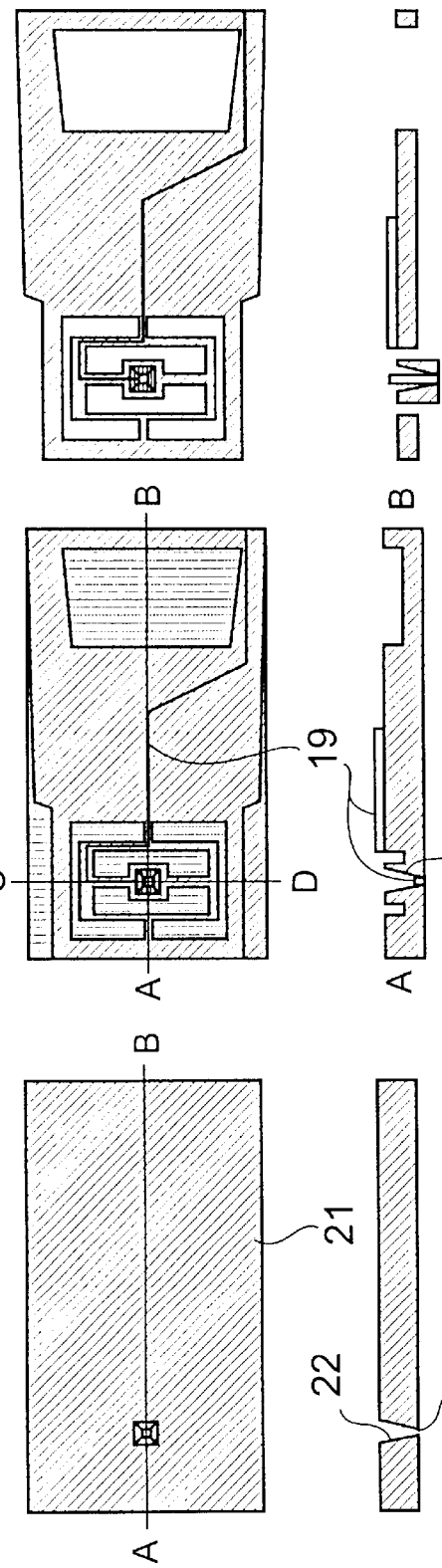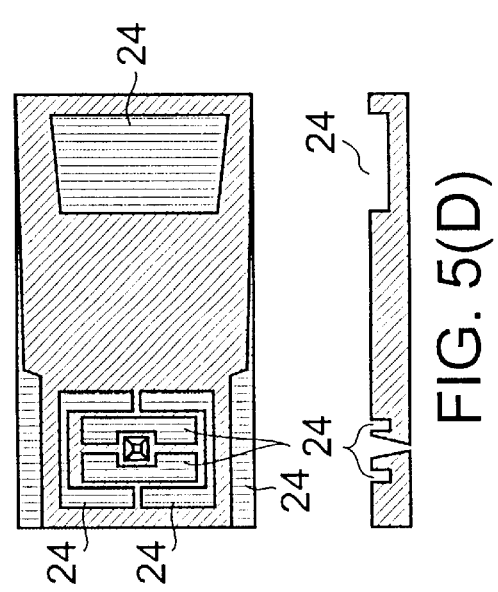
FIG. 5(A) FIG. 5(B) FIG. 5(C) FIG. 5(D)

NEAR FIELD OPTICAL HEAD HAVING FLEXIBLE STRUCTURE

FIELD OF THE INVENTION

The present invention relates to an optical head for a recording apparatus used for recording and reproducing (writing and reading) information (data) at a high density by detecting an interaction between light and a very small area of a surface of a record medium by utilizing light, and more particularly, to a near-field light information recording apparatus for observing structural information or optical information at a very small area equal to or smaller than a wavelength of incident light for use in information recording and reproduction at a high density.

BACKGROUND OF THE INVENTION

In recent years, the development of an apparatus for recording and reproducing information at a high density utilizing light, such as an optical disc, has been intensely pursued. For high density information storage, it is necessary to shorten a wavelength of light by utilizing ultraviolet light or the like; however, there is a limit to such reduction. Therefore, there is a method for effectively reducing the wavelength of light using an objective solid immersion lens. Another method of effectively shortening a wavelength utilizes near-field light for constituting a component of a wave number by an imaginary number.

A high resolution probe utilizing near-field light is used in a near-field optical microscope or a near-field optical head. By generating near-field light from a front end of a probe and detecting propagated light generated as a result of an interaction between the near-field light and a sample of a microscope or a recording medium, a spatial resolution exceeding the diffraction limit of light is obtained. There is also a method of detecting near-field light generated as a result of an interaction between incident propagated light and a sample or a record medium by a probe. A near-field light microscope achieves a resolution exceeding the diffraction limit of a conventional optical microscope by use of this principle. Further, when such a near-field optical probe is utilized in a near-field optical head, there can be achieved a data recording density exceeding that of a conventional optical disk.

According to a data storage apparatus using a near-field light head, the basic constitution is the same as that of a conventional magnetic disk apparatus a near-field light probe is used in place of a magnetic head. By such structure, the near-field light probe maintains a constant posture in operation relative to a surface of record medium by a flexible structure. When a length direction of a suspension arm is defined as z-axis, a direction orthogonal to the z-axis and in parallel with the record medium and a vertical direction are defined as x-axis and y-axis respectively, a typical flexible structure is referred to as flexure structure having a slider that is connected to a frame-like structure only in the x-axis direction on an inner side of the frame-like structure connected to the suspension arm only in the z-axis direction. By such a structure, the frame-like structure is provided with a rotational degree of freedom with respect to the z-axis and the slider is provided with a degree of freedom with the x-axis as a rotating axis relative to the frame-like structure. That is, the slider is provided with rotational degrees of freedom with z-axis and x-axis as axes thereof relative to the suspension arm.

In making light incident on the slider relative to the suspension arm constituted in this way, an optical fiber or a waveguide is connected to the slider or light is irradiated to an upper face or a side face of the slider.

However, when light is made incident on the slider by the above-described structure, connection of some member, such as the waveguide, to the slider hinders free movement of the slider, it is difficult to maintain the posture of the slider and a distance between a surface of the record medium and a very small aperture cannot be maintained constant. When the distance between the surface of the record medium and the very small aperture is not constant, optical intensity related to the interaction is not made constant and a stable output signal cannot be provided. In order to carry out high-speed recording/reproduction, it is necessary to reduce noise. However, noise reduction becomes difficult when the signal is not stabilized. Further, when light is made incident on the slider by aerial propagation, it is extremely difficult to move incident light in synchronism with the movement of the slider. When light is made incident on an upper face of the slider by the aerial propagation, it is necessary to arrange structure for light reflection above the slider and this poses a problem in that the entire apparatus becomes large-sized.

SUMMARY OF THE INVENTION

In order to resolve the above-described problems, according to a first aspect of the invention, there is provided an optical head comprising a slider supported by a suspension arm providing a load weight, provided with air bearing force by a movement thereof relative to a record medium and producing a clearance between the record medium and the slider by a balance between the load weight and the air bearing force, a flexible structure by which the slider can change a posture thereof relative to the suspension arm, an arm-to-slider light guiding structure for projecting light from the suspension arm to a surface of the slider, an aperture formed at a bottom face of the slider for interacting with the record medium via light, and an in-slider light guiding structure for projecting light from the surface of the slider to the aperture, wherein information is recorded and reproduced by the interaction between the record medium and the aperture via the light when the slider scans the surface of the record medium, and wherein the flexible structure is integrated with the arm-to-slider light guiding structure.

According to the first aspect of the invention, when the slider scans the surface of the record medium, the slider and the suspension arm are connected and light is conveyed from one to the other with high and stabilized efficiency while maintaining the posture of the slider constant relative to the surface of the record medium. Thereby, a stable output signal is provided and high-speed recording/reproduction can be carried out. Further, in comparison with related art in which the flexible structure and the arm to slider light guiding structure are separated from each other, downsizing of the entire apparatus is realized.

Further, according to a second aspect of the invention, there is provided an optical head according to the first aspect, wherein the flexible structure is fabricated with an optical waveguide formed thereon.

According to the second aspect of the invention, in addition to an effect realized by the first aspect of the invention, the flexible structure is fabricated from a single substrate and accordingly, fabrication steps can be simplified and the optical head can be fabricated at a low cost.

Further, according to a third aspect of the invention, there is provided the optical head according to the first aspect, wherein the flexible structure is fabricated by adhering or forming the light guiding structure to the surface or the inner portion of the flexible structure.

According to the third aspect of the invention, in addition to the effect realized by the first aspect of the invention, the flexible structure and the light guiding structure can be fabricated by existing technology and the optical head can be fabricated at a low cost.

Further, according to a fourth aspect of the invention, there is provided the optical head according to any one of the first through the third aspect of the optical heads wherein the arm-to-slider light guiding structure is constituted by a structure having a small light propagation loss.

According to the fourth aspect of the invention, in addition to an effect realized by the first aspect through the third aspect of the optical heads, light loss in guiding light between the arm and the slider can be minimized.

Further, according to a fifth aspect of the invention, there is provided the optical head according to any one of the first through the third aspect of the optical heads wherein the arm to slider light guiding structure is formed in a linear line or a shape having a small radius of curvature.

According to the fifth aspect of the invention, in addition to the effect realized by the first aspect through the third aspect of the optical heads, light loss in guiding light between the arm and the slider can be minimized.

Further, according to a sixth aspect of the invention, there is provided the optical head according to any one of the first aspect through the fifth aspect of the optical heads wherein the aperture is as small as a size equal to or smaller than a wavelength of light and the light interacting with the record medium is near-field light.

According to the sixth aspect of the invention, in addition to the effect realized by the first aspect through the fifth aspect of the optical heads, by utilizing super resolution that is a characteristic of the near-field light, a record density exceeding the diffraction limit of light is realized. Further, with regard to each of effects realized by the first aspect through the fifth aspect of the optical heads, regardless of distance dependency of optical intensity which is a characteristic of the near-field light, a stable signal output is provided and high speed recording/reproduction can be carried out.

BRIEF DESCRIPTION OF THE DRAWINGS

FIGS. 5A, 5B, 5C and 5D are views showing a method of fabricating a suspension arm integrated with the flexure for an optical head according to Embodiment 2 of the invention.

DETAILED DESCRIPTION OF THE PREFERRED EMBODIMENTS (Embodiment 1)

Figure 1:
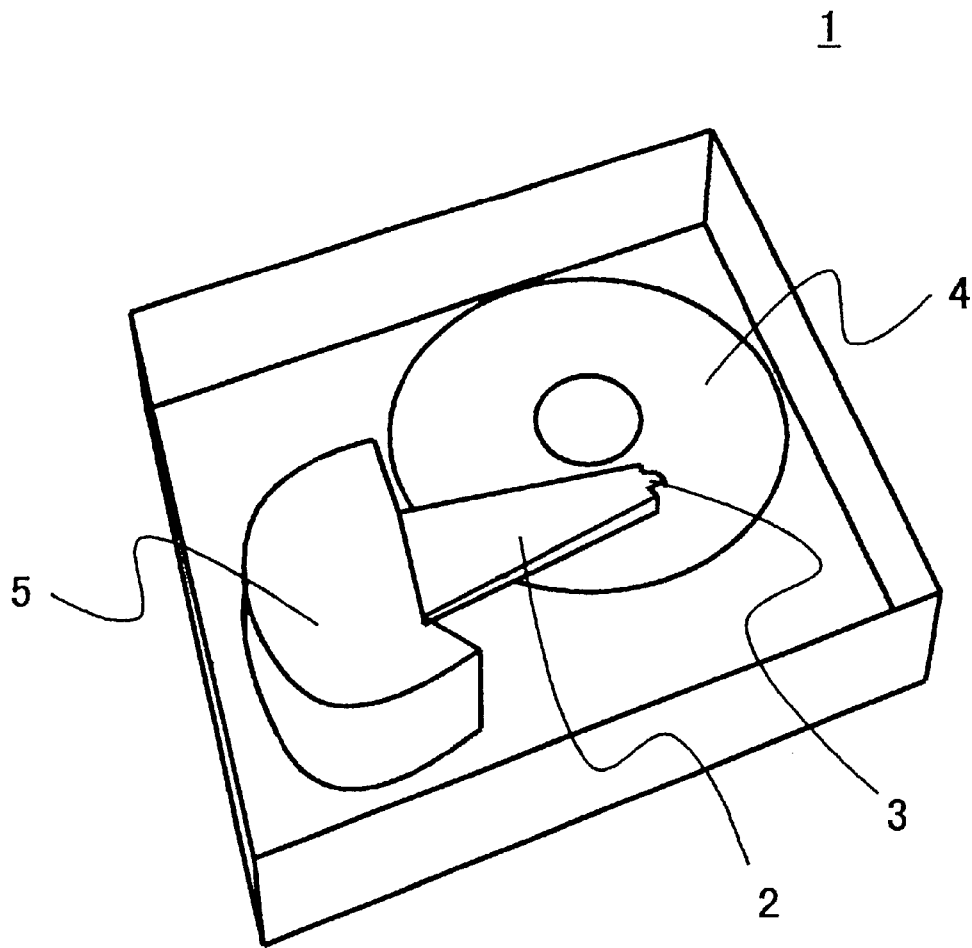
FIG. 1 is a view showing the outline of an optical data storage apparatus according to Embodiment 1 of the invention.

FIG. 1 shows an outline of an optical data storage apparatus according to Embodiment 1 of the invention. The basic constitution is similar to that of a magnetic disk apparatus of related art. That is, a flexure 3 is formed at a front end portion of a suspension arm 2 and a motor (not illustrated) rotates at high speed a recording medium 4. A near-field light aperture (not illustrated) is brought in close proximity to the surface of the recording medium 4, such as several tens of nanometers and the near-field light aperture is floated at a constant distance relative to the recording medium 4. The suspension arm 2 is movable in the radius direction of the record medium 4 by a voice coil motor 5. Light is guided to a vicinity of the flexure 3 by an optical waveguide or an optical fiber adhered to or formed on the suspension arm 2.

Scattered light generated as a result of an interaction by the near-field with the record medium, is received by, for example, a light receiving element (not illustrated) adhered onto the flexure, converted into an electric signal and transmitted to a signal processing circuit (not illustrated). The signal is amplified by an amplifying circuit as necessary to thereby constitute a reproduced signal of information. Although according to the embodiment, there is carried out an illumination mode for generating the near-field light from a very small aperture and scattering thereof by the record medium, the present invention can similarly be embodied also by a collection mode for generating the near-field light at a surface of the record medium and focusing light scattered by the very small aperture.

Figure 2:
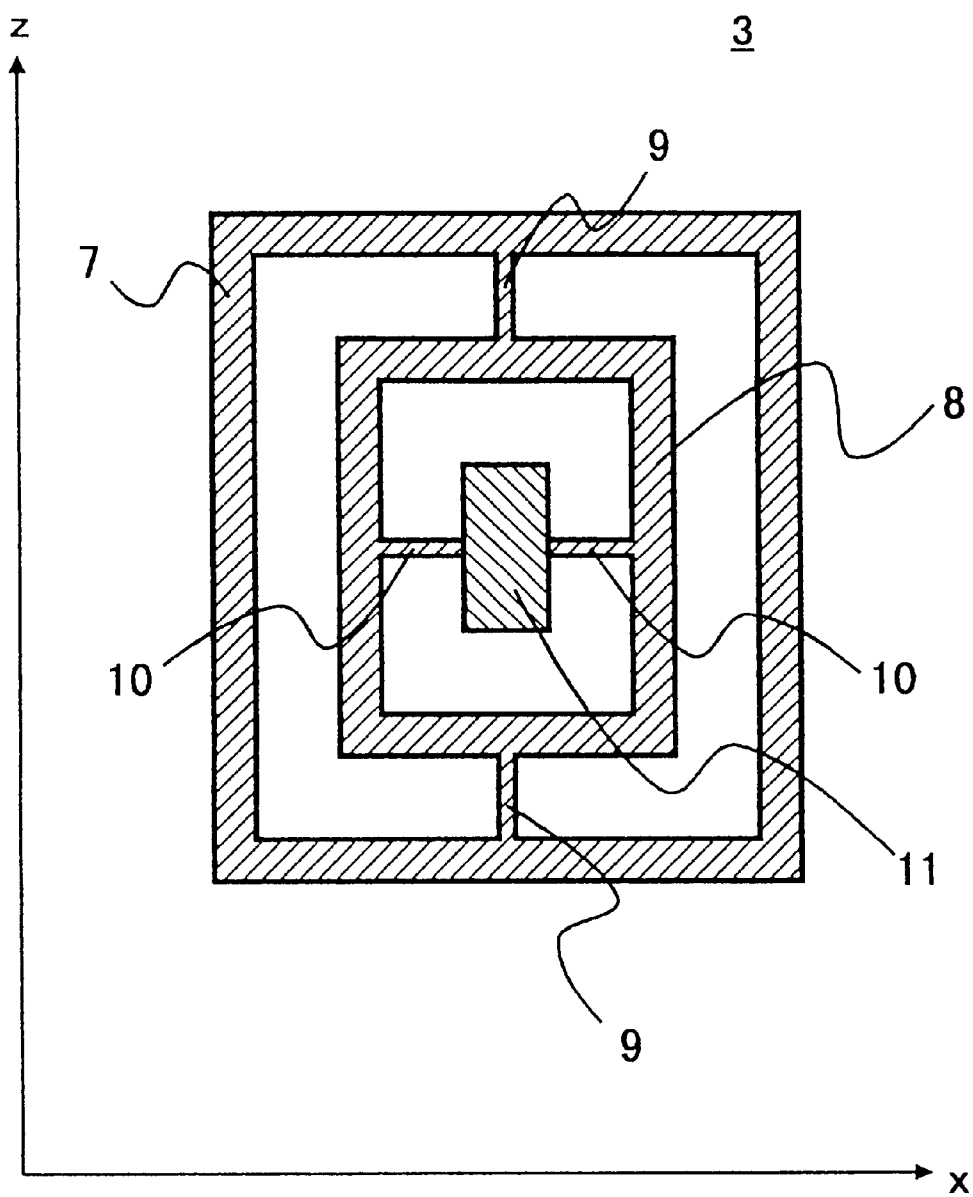
FIG. 2 is a view showing a flexure structure f or an optical head according to Embodiment 1 of the invention.

FIG. 2 shows a flexure structure for a near-field light head according to Embodiment 1 of the invention. There is a second or inner frame 8 made of stainless steel connected to a first or outer frame 7 made of stainless steel by rolling support shafts 9 which allow relative rolling movement of the inner frame 8 with respect to the outer frame 7. A slider 11 is connected to the frame 8 by pitching support shafts 10 which allow relatively pitching movement of the slider 11. By this structure, the slider 11 is provided with various degrees of freedom of rotation around the z-axis and x-axis. There is realized a function of following out-of-phase vibration of the record medium rotating at high speed.

Figure 3:
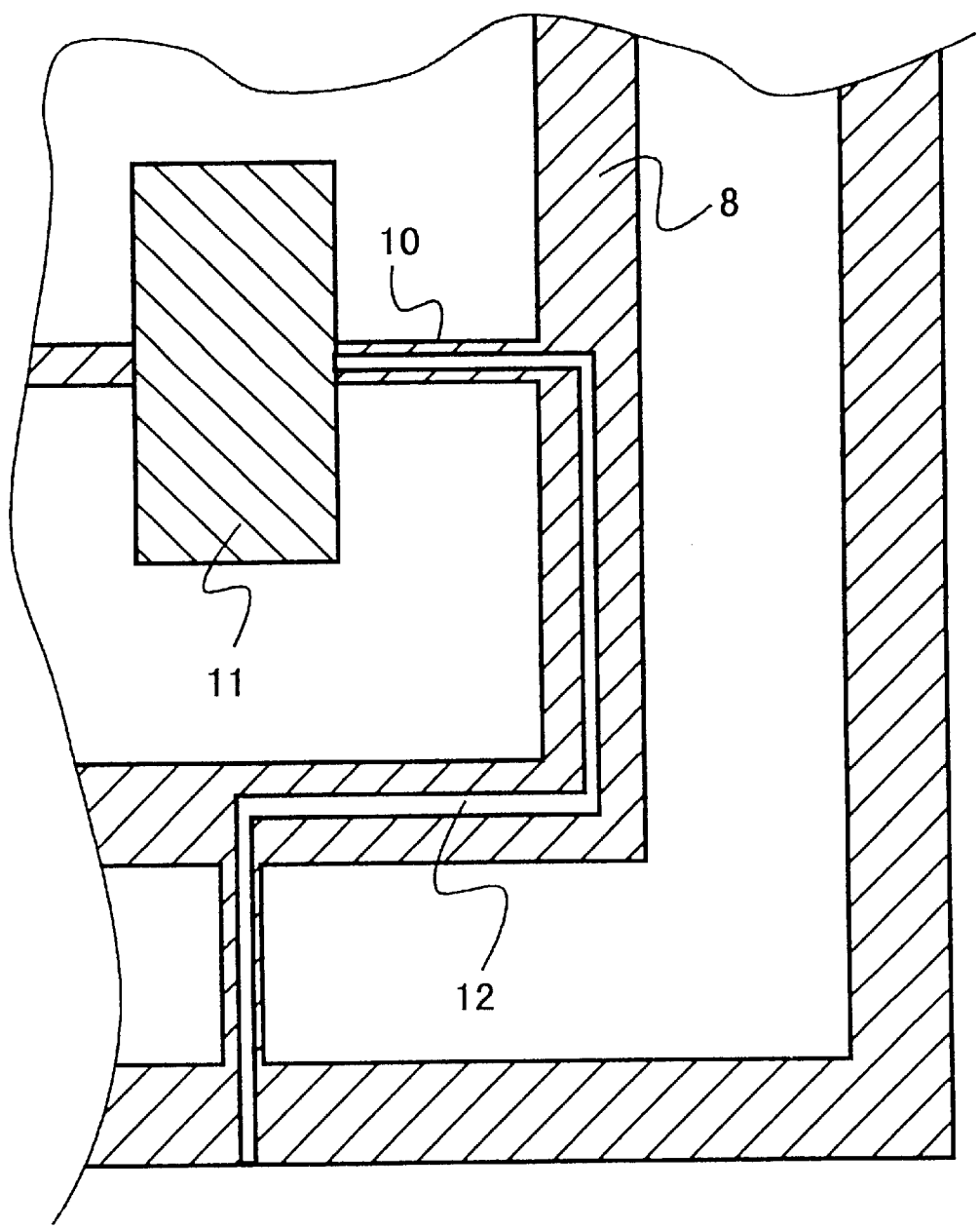
FIG. 3 is an enlarged view showing the flexure for an optical head according to Embodiment 1 of the invention.

FIG. 3 shows an enlarged view of the flexure for the near-field light head according to Embodiment 1 of the invention. An optical waveguide 12 is adhered to a surface of a supporter for connecting the suspension arm and the slider. The optical waveguide 12 is a waveguide on a silicon substrate fabricated by a semiconductor process and is adhered onto the flexure. At this occasion, the light waveguide 12 is adhered thereto by making optical axes of a light incident port (not illustrated) of the slider and the optical waveguide 12 coincide with each other. There is no significant change in shape or weight of the flexure and accordingly, there is no adverse influence in the degrees of freedom provided to the above-described slider.

Thereby, the posture of the slider relative to the surface of the record medium can be maintained constant, further, since the waveguide is directly connected thereto, there is realized incidence of light to the slider at a constant efficiency. Since the interaction by the near-field light is utilized, there is realized recording/reproduction at a record density exceeding the diffraction limit of light. The near-field light generated from the very small aperture is attenuated strongly dependent upon a distance from the very small aperture, however, according to the embodiment, the slider follows the movement of the record medium by the flexure structure and accordingly, stable interaction is always produced and there is provided a signal output which is always stabilized during recording/reproduction of information. Further, small-sized formation of the entire apparatus can be realized since the flexure and the light guiding structure are integrated. Such a flexure is easy to fabricate and can be mass-produced at a low cost.

(Embodiment 2)

Figure 4:
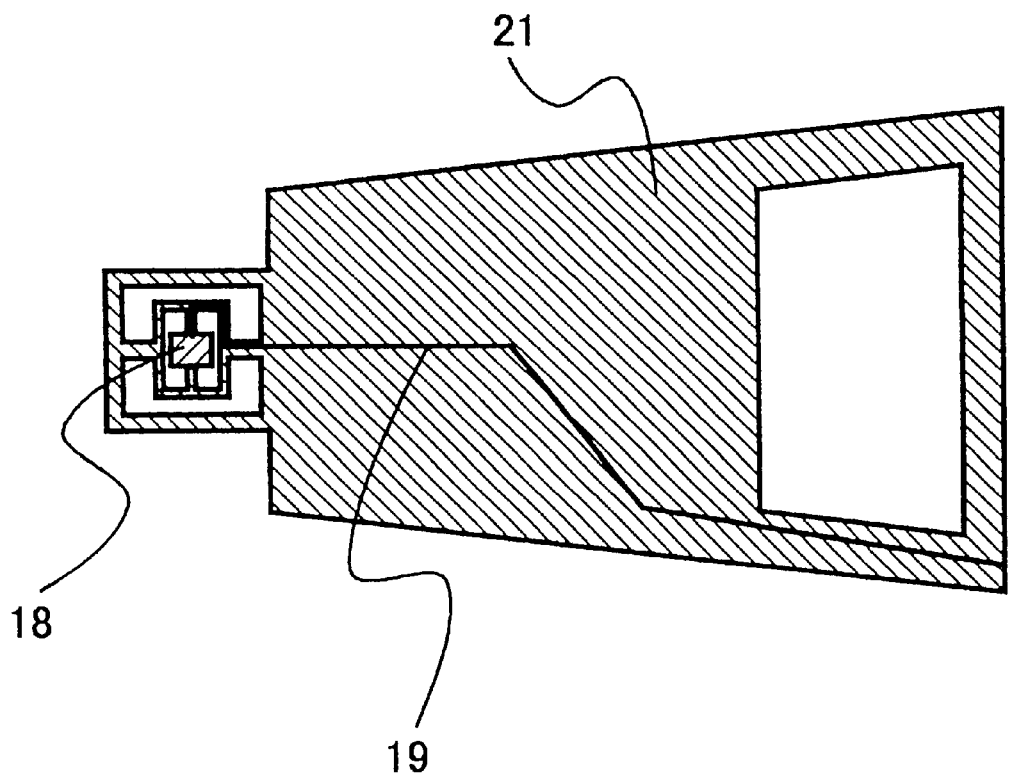
FIG. 4 is a total View showing a suspension arm integrated with a flexure for an optical head according to Embodiment 2 of the invention.

FIG. 4 shows a total view of a suspension arm integrated with a flexure for a near-field light head according to Embodiment 2 of the invention. The total is constructed by a structure of one sheet of flat plate of a silicon substrate 21. A waveguide 19 is formed at an upper face of the silicon substrate 21 and is formed from a side (right end of the drawing) of a rotating shaft (not illustrated) of a suspension arm to a slider 18 in the flexure. It is not necessary that the light guiding structure is limited to the constitution with silicon for the substrate but there may be constructed a light guiding structure fabricated on a supporter formed of plastic materials. Light propagated to the slider 18 is guided to the very small aperture by changing a propagating direction thereof by, for example, forming a light reflecting film at an upper face of the slider. The light is converted into near-field light by the very small aperture formed in the slider and interacts with the record medium. An operational mechanism thereafter is the same as that explained in Embodiment 1 and accordingly, an explanation thereof will be omitted.

FIGS. 5A through 5D show a method of fabricating a suspension arm integrated with the flexure for a near-field light head according to Embodiment 2. In respective drawings of FIGS. 5A through FIG. 5D, top views are shown on the upper side and sectional views taken along a line segment AB indicated in the FIG. 5A are shown on the lower side. Although there is used the silicon substrate 21 having a thickness of about 500 through 1000 micrometers, there may be used a substrate having a different thickness. In FIG. 5A, there is provided a taper structure 22 in a shape of an inverse cone at the silicon substrate 21 by anisotropic etching. There is formed a very small aperture 23 having a diameter of about 100 nanometers at a top portion of the inverse cone, that is, a bottom face of the silicon substrate. In FIG. 5B, there are formed recesses 24 patterned at an upper face of the silicon substrate by etching. The portions finally constitute through holes. In FIG. 5C, after vapor-depositing a light shielding film (not illustrated) of aluminum at the taper portion 22 with a thickness of 100 nanometers, the optical waveguide 19 having a clad-core-clad structure is patterned and laminated. A middle view of FIG. 5C is the sectional view taken along the line segment AB in an upper view and a lower view is a sectional view taken along a line segment CD in the upper view. Finally, in FIG. 5D, the recesses 24 are removed from a lower face of the silicon substrate by etching to thereby finish the suspension arm.

The suspension arm formed by the above-described method is constructed by a structure having the function of a flexure structure provided to a suspension arm of a conventional magnetic disk apparatus integrated with a slider, a near-field light head and a waveguide structure for guiding light from a light source (not illustrated) to the very small aperture formed at the front end of the head. Thereby, not only can stable incidence of light to the slider be carried out but also the method of fabricating the suspension arm is easily facilitated and inexpensive.

(Embodiment 3)

Figure 6:
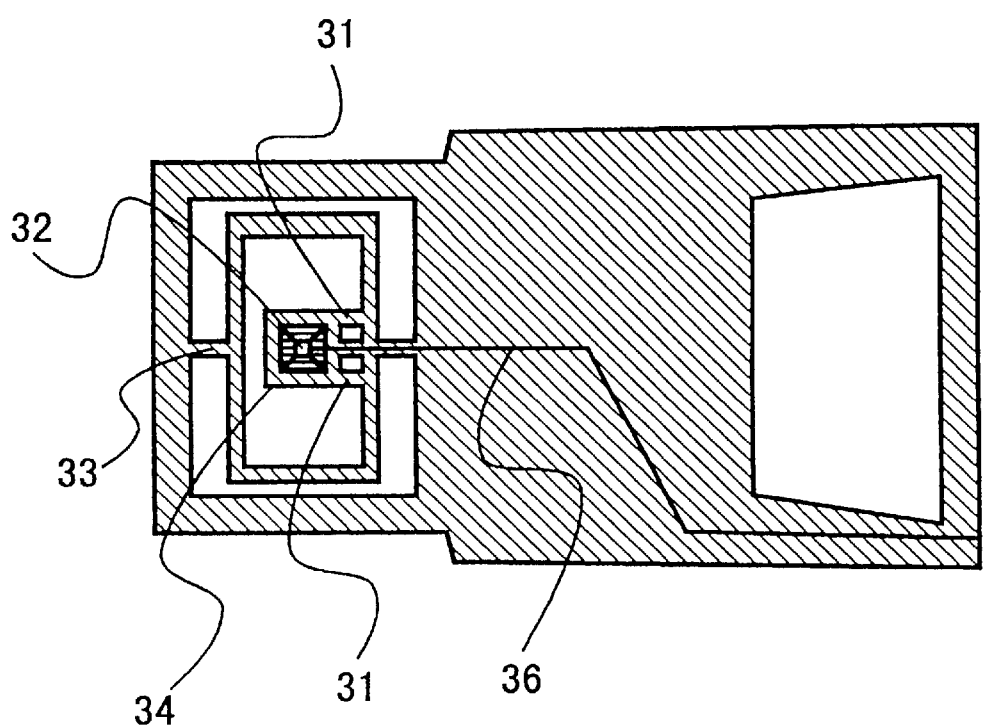
FIG. 6 is a total view showing a suspension arm integrated with a flexure for an optical head according to Embodiment 3 of the invention.

FIG. 6 shows a total view of a suspension arm integrated with a flexure for a near-field light head according to Embodiment 3. A slider 34 undergoes rolling by means of a rolling support shaft 33 and pitching by means of pitching support shafts 31. The slider 34 is formed with a taper at a front end of which a very small aperture 32 is formed. An optical waveguide 36 may be formed integrally with the suspension arm as in Embodiment 2 or may be formed separately from the suspension arm and adhered thereto. The feature of the present embodiment resides in that by arranging the pitching support shafts 31 to be directed in the length direction of the suspension arm, the slider 34 can be formed to linearly direct light to the slider 34 without the slider 34 being curved at a midway thereof. The shafts are formed by a shape which is slender in the length direction of the suspension arm and accordingly, the shafts are difficult to deform in the rolling direction and are easy to deform in the pitching direction. Although according to the embodiment, the pitching support shafts 31 are formed in a shape in which three legs of beams are connected to the slider, any number of legs of beams may be connected thereto and there may be formed any shape so far as there is formed a structural member capable of pitching and having some linear shape from the suspension arm to the slider. By a combination of the pitching support shafts 31 and the rolling support shaft 33, the slider is provided with the same degrees of freedom as those of a slider in a magnetic disk of the related art.

Since the optical waveguide 36 is formed linearly, propagation loss at a midway thereof can significantly be restrained. It is apparent from the embodiment that such an effect can be realized by any structure other than the structure of the embodiment in which some structural member is linearly connected from a suspension arm to a slider.

Further, even in the case that a near-field light head is fabricated by using a very small projection for scattering near-field light at a surface of a record medium in place of a very small aperture interactively operated with a record medium via the near-field light, a structure similar to that in the above-described embodiment can be fabricated and it is possible that scattered light is received by a light receiving element arranged at a vicinity of the very small projection and the light is thereafter propagated by an optical waveguide at inside of a suspension arm having the above-described structure and transmitted to a signal processing circuit. Thereby, light can be propagated with a stabilized efficiency.

(Embodiment 4)

Figure 7:
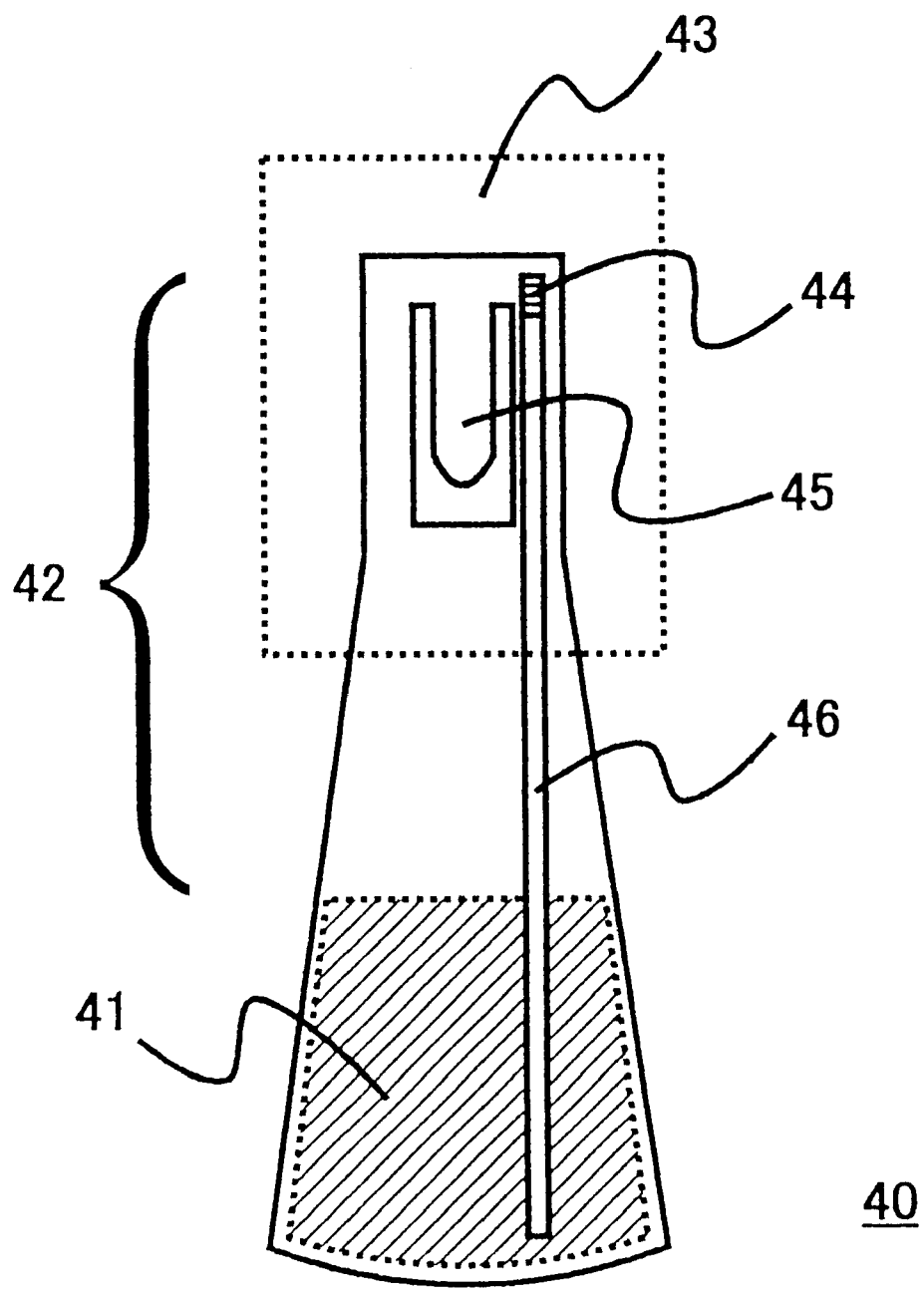
FIG. 7 is an upper view showing a flexure for a near-field light head according to Embodiment 4 of the invention.
Figure 8:
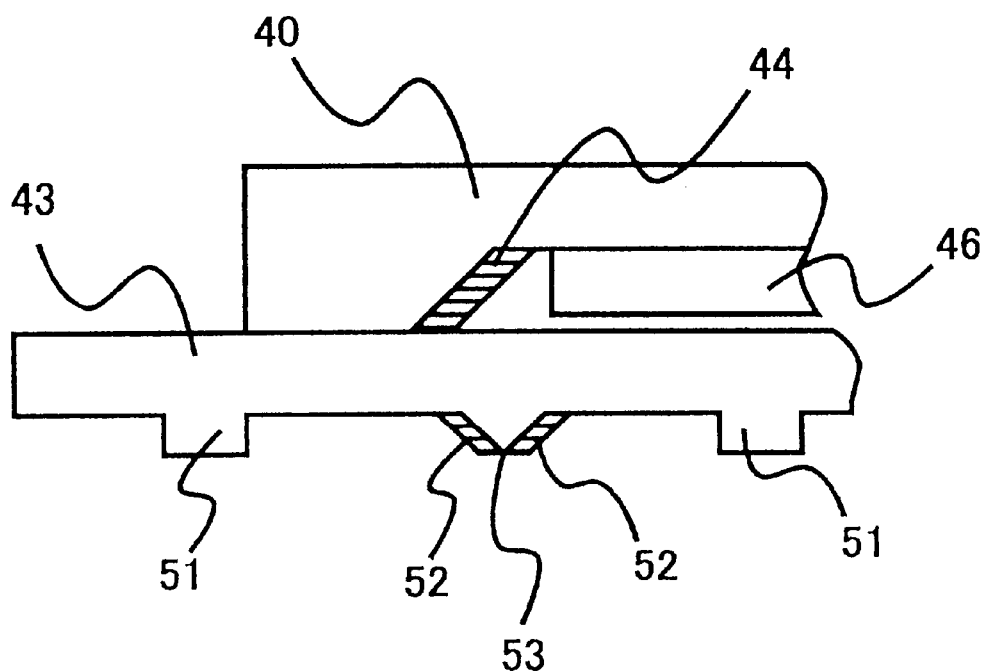
FIG. 8 is a sectional view of the near-field light head and a front end portion of the flexure according to Embodiment 4 of the invention.

FIG. 7 shows a top view of a flexure 40 for a near-field light head according to Embodiment 4. The flexure 40 is adhered to a suspension arm, not illustrated, at an adhering portion 41. A movable portion 42 is not adhered to the suspension arm and accordingly, is provided with some degrees of freedom. A near-field light head 43 is adhered to a cantilever 45 formed at a front end of the flexure 40. The flexure 40 comprises Si and a waveguide 46 is fabricated by forming a silicon oxide film on Si. Although in this case, the waveguide 46 is fabricated at an upper face of the flexure 40, the waveguide 46 can also be fabricated at a lower face thereof. Light emitted from a front end of the waveguide 46 is reflected by a mirror face 44 and is propagated in the direction of the near-field light head 43. The mirror face is formed by vapor-depositing a material having high reflectivity such as Al on an inclined face of an Si substrate by anisotropic etching. FIG. 8 is a sectional view of the near-field light head 43 and a front end portion of the flexure 40 according to Embodiment 4. The near-field light head 43 is formed with air bearing surfaces 51 at a lower face thereof (face directed to a record medium, not illustrated) and a very small aperture 53 surrounded by a light shielding film 52.

The air bearing surfaces 51 receive air bearing force produced by rotational movement of the record medium from a lower direction of the drawing, thereby, the near-field light head 43 and the movable portion 42 of the flexure 40 are moved and the near-field light head 43 maintains always at the same posture relative to the surface of the record medium. Light is emitted from the waveguide 46, reflected by the mirror face 44 and is propagated to the very small aperture 53 with stabilized high efficiency.

Figure 9:
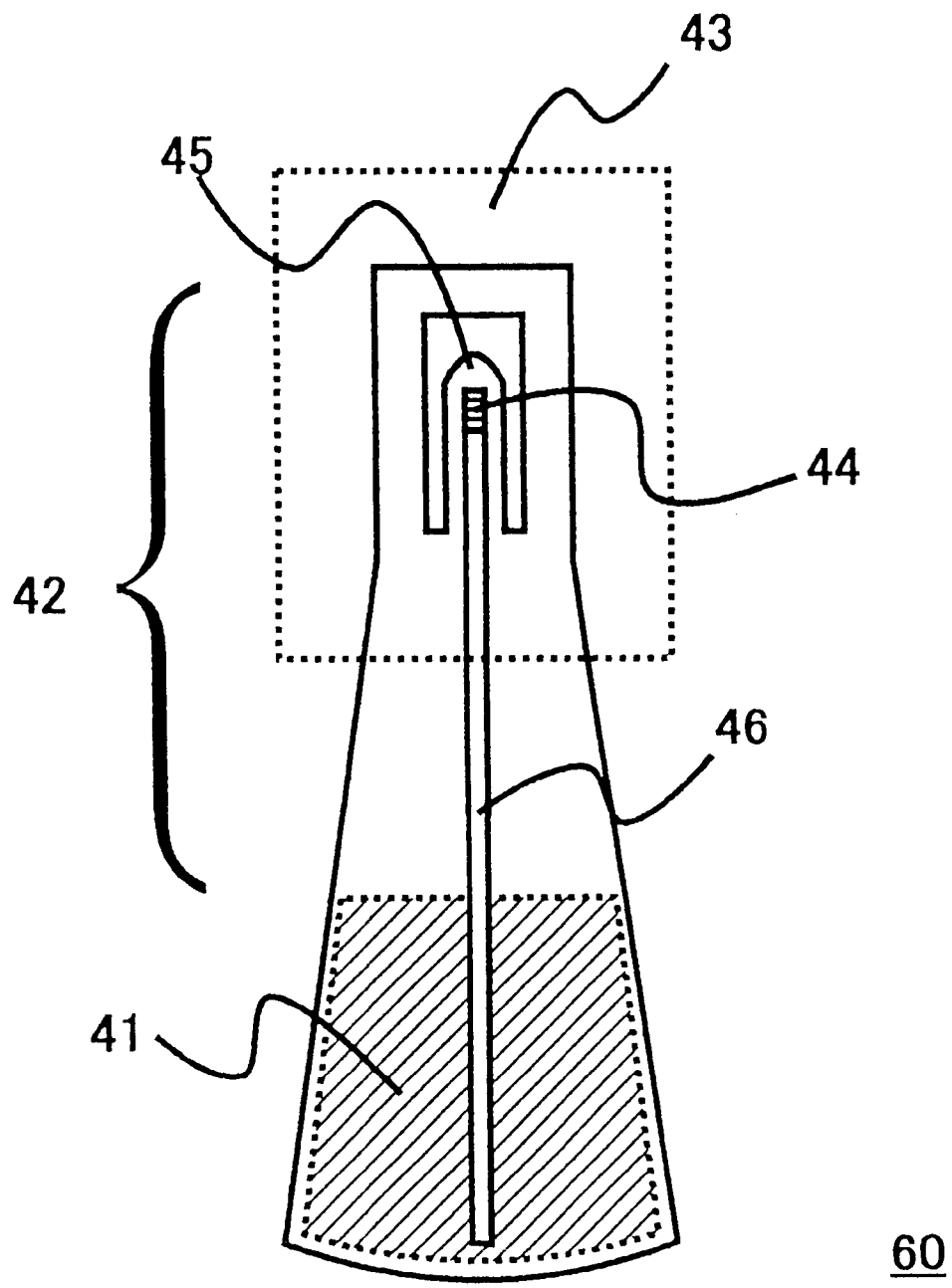
FIG. 9 is an upper view showing a flexure for other near-field light head according to Embodiment 4 of the invention.

According to the embodiment, the waveguide 46 is formed at a position shifted from center of the flexure 40 to the right side of the drawing in order to make the very small aperture 53 as proximate to the record medium as possible. This corresponds to the fact that the right side of the drawing is floated up in the posture proximate to the surface of the record medium more than the left side since the air bearing force by air received by the near-field light head 43 is operated from the left direction of the drawing. Meanwhile, as other embodiment, as shown by FIG. 9, it is possible to construct a structure in which the waveguide 46 is formed at the center of the flexure 40 and light is curved by the mirror face 44 on the cantilever 45. This is basically the same as the structure which is embodied in Embodiment 3.

As explained above, according to the first aspect of the invention, there is provided an optical head comprising a slider supported by a suspension arm providing a load weight, provided with an air bearing force generated by movement thereof relative to a record medium and producing a clearance between the record medium and the slider by a balance between the load weight and the air bearing force, a flexible structure by which the slider can change a posture thereof relative to the suspension arm, an arm-to-slider light guiding structure for projecting light from the suspension arm to a surface of the slider, an aperture formed at a bottom face of the slider for interacting with the record medium via light, and an in-slider light guiding structure connecting the surface of the slider and the aperture by light, wherein information is recorded and reproduced by the interaction between the record medium and the aperture via the light when the slider scans a surface of the record medium, and wherein the flexible structure is integrated with the arm-to-slider light guiding structure. Therefore, there is achieved the effect of realizing that when the slider scans the surface of the record medium, while maintaining constant the posture of the slider relative to the surface of the record medium, the slider and the suspension arm can be connected with a high and stable efficiency by light. Further, there is achieved an effect of realizing that a stable output signal is provided, high speed recording/reproduction can be carried out and in comparison with related art in which the flexible structure and the arm-to-slider light guiding structure are separated from each other, a total of the apparatus is downsized.

Further, according to the second aspect of the invention, there is provided the optical head according to the first aspect of the optical head wherein the flexible structure is fabricated by an optical waveguide. Therefore, there is achieved the effect that in addition to the effect realized by the first aspect of the optical head, the flexible structure is fabricated from a single substrate and accordingly, fabricating steps are simplified and the optical head can be fabricated at a low cost. Further, according to the third aspect of the invention, there is provided the optical head according to the first aspect of the optical head wherein the flexible structure is fabricated by adhering or forming the light guiding structure to a surface or an inner portion of the flexible structure. Therefore, there is achieved the effect that in addition to the effect realized by the first aspect of the optical head, the flexible structure and the light guiding structure can be fabricated by related art and the optical head can be fabricated at a low cost.

Further, according to the fourth aspect of the invention, there is provided the optical head according to any one of the first aspect through the third aspect of the optical heads wherein the arm-to-slider light guiding structure is constituted by a structure having a small light propagation loss. Therefore, there is achieved the effect that in addition to the effect realized by the first aspect through the third aspect of the optical heads, light loss in guiding light between the arm and the slider can be minimized.

Further, according to the fifth aspect of the invention, there is provided the optical head according to any one of the first aspect through the third aspect of the optical head wherein the arm-to-slider light guiding structure is formed in a linear line or a shape having a small radius of curvature. Therefore, there is achieved the effect that in addition to the effect realized by the first aspect through the third aspect of the optical heads, light loss in conducting light between the arm and the slider can be minimized.

Further, according to the sixth aspect of the invention, there is provided the optical head according to any one of the first aspect through the fifth aspect of the optical heads wherein the aperture is as small as a size equal to or smaller than a wavelength of light and the light interacting with the record medium is near-field light. Therefore, in addition to the effect realized by the first aspect through the fifth aspect of the optical heads, by utilizing ultra resolution which is a characteristic of the near-field light, a record density exceeding a diffraction limit of light is realized. Further, with regard to each of the effects realized by the first aspect through the fifth aspect of the optical heads, there is achieved the effect that regardless of distance dependency of optical intensity which is a characteristic of the near-field light, a stable signal output is provided and high speed recording/reproduction can be carried out.

What is claimed is:

1. An optical head comprising:
    a slider supported by a suspension arm such that a load weight is placed on the suspension arm, the load weight being counterbalanced by an air bearing force generated by movement of the slider relative to a recording medium so as to produce a clearance between the recording medium and the slider;
    a flexible structure linking the slider to the suspension arm so that a posture of the slider relative to the suspension arm can be changed;
    an arm-to-slider light guiding structure for guiding light between the suspension arm and the slider;
    a minute aperture formed at a bottom face of the slider for interacting with the recording medium via near-field light; and
    an in-slider light guiding structure for guiding light between the surface of the slider and the aperture;
    wherein information is recorded to and/or read from the recording medium based on the scattering of near-field light between the recording medium and the aperture while the slider is being scanned over the surface of the recording medium; and
    wherein the flexible structure is integrated with the arm-to-slider light guiding structure.

2. An optical head according to claim 1; wherein the flexible structure has an optical waveguide formed thereon.

3. An optical head according to claim 1; wherein the arm-to-slider and in-slider light guiding structures are adhered to the flexible structure.

4. An optical head according to any one of claims 1 through 3; wherein the arm-to-slider light guiding structure has a small light propagation loss.

5. An optical head according to any one of claims 1 through 3; wherein the arm-to-slider light guiding structure is formed in a linear line or a shape having a small radius of curvature.

6. An optical head according to claim 1; wherein the minute aperture has a size equal to or smaller than a wavelength of light.

7. An optical head according to claim 1; wherein the slider, the suspension arm and the flexible structure are formed of a single etched semiconductor substrate.

8. An optical head according to claim 7; wherein the aperture comprises an inverted conical hole formed in the semiconductor substrate.

9. An optical head according to claim 7; wherein the in-slider light guiding structure comprises a reflective coating formed on a portion of the substrate for reflecting light from the slider through the aperture and onto the recording medium.

10. An optical head according to claim 1; further comprising projections formed on a surface of the suspension arm confronting the recording medium to produce the air bearing force in response to relative movement between the recording medium and the slider.

11. An optical head according to claim 1; wherein the flexible structure comprises an outer frame attached to the suspension arm and an inner frame attached to the outer frame, and the slider is attached to the inner frame.

12. An optical head according to claim 11; further comprising rolling support members for attaching the inner frame to the outer frame to allow relative rolling movement of the inner frame with respect to the outer frame, and pitching support members for attaching the slider to the inner frame to allow relative pitching movement of the slider with respect to the inner frame.

13. An optical head according to claim 1; wherein the recording medium comprises an optical disc.

14. An optical head according to claim 1; wherein the arm-to-slider light guiding structure comprises an optical waveguide formed of patterned films formed on the flexible structure.

15. An optical information device comprising: a suspension arm; a moving mechanism for movably supporting the suspension arm relative to a recording medium; an optical head supported by the suspension arm proximate the recording medium and having a slider provided with a minute aperture and a flexible structure for linking the slider to the suspension arm so that the slider undergoes relative sliding movement with respect to the recording medium for at least one of recording information to the recording medium and reading information from the recording medium by producing or scattering near-field light between the minute aperture and the recording medium; and an optical waveguide integral with the flexible structure for guiding light between the suspension arm and the minute aperture formed in the slider.

16. An optical head according to claim 15; wherein the optical waveguide comprises patterned films formed on the optical head.

17. An optical information device according to claim 15; wherein the moving mechanism comprises a voice coil motor.

18. An optical information device according to claim 15; wherein the recording medium comprises an optical disc.

19. An optical information device according to claim 15; wherein the flexible structure comprises an outer frame attached to the suspension arm, and an inner frame attached to the outer frame, the slider being attached to the inner frame.

20. An optical information device according to claim 19; further comprising rolling support members for attaching the inner frame to the outer frame to allow relative rolling movement of the inner frame with respect to the outer frame, and pitching support members for attaching the slider to the inner frame to allow relative pitching movement of the slider with respect to the inner frame.

21. An optical information device according to claim 15; wherein the optical head is supported by the suspension arm such that a load weight is placed on the suspension arm by the optical head and the load weight is counterbalanced by an air bearing force generated by relative movement of the optical head with respect to the recording medium so as to produce a gap between the recording medium and the optical head.

22. An optical information device according to claim 15; wherein the slider, the suspension arm and the flexible structure are formed of a single etched semiconductor substrate.

23. An optical information device according to claim 22; further comprising an aperture comprised of an inverted conical hole formed in the semiconductor substrate.

* * * * *